(12) United States Patent
Reville et al.

(10) Patent No.: US 8,920,241 B2
(45) Date of Patent: Dec. 30, 2014

(54) GESTURE CONTROLLED PERSISTENT HANDLES FOR INTERFACE GUIDES

(75) Inventors: Brendan Reville, Seattle, WA (US);
Jack Bridges, Kirkland, WA (US); Andy Mattingly, Kirkland, WA (US); Jordan Andersen, Kirkland, WA (US);
Christian Klein, Duvall, WA (US);
Arjun Dayal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 12/969,377

(22) Filed: Dec. 15, 2010

(65) Prior Publication Data

US 2012/0157208 A1   Jun. 21, 2012

(51) Int. Cl.
| | | |
|---|---|---|
| G06F 3/14 | (2006.01) | |
| G06F 3/01 | (2006.01) | |
| G06F 3/0482 | (2013.01) | |
| A63F 13/20 | (2014.01) | |
| G06F 3/0481 | (2013.01) | |

(52) U.S. Cl.
CPC .............. *G06F 3/017* (2013.01); *G06F 3/0482* (2013.01); *A63F 2300/308* (2013.01); *A63F 2300/6045* (2013.01); *A63F 2300/1093* (2013.01); *A63F 13/06* (2013.01); *G06F 3/04817* (2013.01)
USPC ................... 463/37; 463/36; 463/38; 463/39; 345/156; 345/157; 345/158; 345/159; 715/810

(58) Field of Classification Search
USPC ................................ 463/36–39; 345/156–159
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Scrollbar, Apr. 28, 2009, Wiki, <http://web.archive.org/web/20090428143935/http://en.wikipedia.org/wiki/Scrollbar>.*

(Continued)

*Primary Examiner* — Justin Myhr
(74) *Attorney, Agent, or Firm* — Micah Goldsmith; Leonard Smith; Micky Minhas (57) ABSTRACT

A computing system translates a world space position of a hand of a human target to a screen space position of a user interface and locks the hand to a handle of the user interface if world space parameters of the hand overcome a grab threshold of the handle. When the hand is locked to the handle, the computing system translates a world space position of the hand to a screen space handle position that is constrained along one or more interface guides. The hand is unlocked from the handle at a release position of the handle if world space parameters of the hand overcome a release threshold of the handle. The handle is retained at the release position after the hand is unlocked from the handle.

20 Claims, 7 Drawing Sheets

(56) References Cited

U.S. PATENT DOCUMENTS

| | | | |
|---|---|---|---|
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,643,721 | B1 * | 11/2003 | Sun .................................. 710/62 |
| 6,661,918 | B1 | 12/2003 | Gordon et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,173,604 | B2 | 2/2007 | Marvit et al. |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |

(56) References Cited

U.S. PATENT DOCUMENTS

| | | | |
|---|---|---|---|
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2007/0132725 | A1* | 6/2007 | Kitaura .................. 345/156 |
| 2008/0026838 | A1 | 1/2008 | Dunstan et al. |
| 2008/0052643 | A1* | 2/2008 | Ike et al. ................ 715/863 |
| 2008/0088588 | A1* | 4/2008 | Kitaura .................. 345/158 |
| 2008/0300055 | A1* | 12/2008 | Lutnick et al. ........... 463/39 |
| 2009/0027337 | A1* | 1/2009 | Hildreth ................ 345/158 |
| 2009/0077504 | A1* | 3/2009 | Bell et al. .............. 715/863 |
| 2009/0289900 | A1 | 11/2009 | Lavski et al. |
| 2010/0037184 | A1 | 2/2010 | Sie |
| 2010/0048241 | A1* | 2/2010 | Seguin et al. .......... 455/556.1 |
| 2011/0197161 | A1* | 8/2011 | Mattingly et al. ........ 715/810 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Wilson, et al., "Gwindows: Towards Robust Perception-Based UI", Retrieved at <<http://www.nuriaoliver.com/GWindows/cvprChi03.pdf>>, First IEEE Workshop on Computer Vision and Pattern Recognition for Human Computer Interaction, 2003, pp. 1-8.

Istance, et al., "Snap Clutch, a Moded Approach to Solving the Midas Touch Problem", Retrieved at http://www.cse.dmu.ac.uk/~svickers/pdf/p221-istance.pdf>>, Eye Tracking Research and Applications, Mar. 26-28, 2008, pp. 221-228.

Bouënard, et al., "Analysis of Percussion Grip for Physically Based Character Animation", Retrieved at http://www-valoria.univ-ubs.fr/Sylvie.Gibet/Publications/ENACTIVE08_AfterReviewing.pdf>>, In Proceedings of the 5th International Conference on Enactive Interfaces, ENACTIVE, Nov. 2008, pp. 1-6.

Vogel, et al., "Distant Freehand Pointing and Clicking on Very Large, High Resolution Displays", Retrieved at <<http://citeseerx.ist.psu.edu/viewdoc/download?doi=10.1.1.83.8022&rep=rep1 &type=pdf>>, The 18th Annual ACM Symposium on User Interface Software and Technology, Oct. 23-27, 2005, pp. 33-42.

Oakley, et al., "Motion marking menus: An eyes-free approach to motion input for handheld devices", Retrieved at <<http://www.whereveriam.org/work/UMa/Oakley_Park_ijhcsArticle.pdf>>, Aug. 15, 2007, pp. 1-18.

Jacoby, et al., "Using virtual menus in a virtual environment", Retrieved at <<http://citeseerx.ist.psu.edu/viewdoc/download-?doi=10.1.1.109.16&rep=rep1&type=pdf >>, In Proceedings of SPIE, 1992, pp. 10.

* cited by examiner

FIG. 7

GESTURE CONTROLLED PERSISTENT HANDLES FOR INTERFACE GUIDES

BACKGROUND

Computer technology has advanced to enable humans to interact with computers in various ways. One such interaction may occur between humans and gaming systems. For example, some gaming systems may respond to a player's physical movement. Such gaming systems may have controls that a user may want to manipulate such as buttons, items on a list, pieces of content, etc.

SUMMARY

Thus, various embodiments related to A computing system are provided. In one example, the computing system translates a world space position of a hand of a human target to a screen space position of a user interface and locks the hand to a handle of the user interface if world space parameters of the hand overcome a grab threshold of the handle. When the hand is locked to the handle, the computing system translates a world space position of the hand to a screen space handle position that is constrained along one or more interface guides. The hand is unlocked from the handle at a release position of the handle if world space parameters of the hand overcome a release threshold of the handle. The handle is retained at the release position after the hand is unlocked from the handle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A depth-image analysis system, such as a 3D-vision computing system, may include a depth camera capable of observing one or more game players or other computer users. As the depth camera captures images of a game player or other computer user within an observed scene, those images may be interpreted and modeled with one or more virtual skeletons. As such, the computing system may be able to determine if the player's hand is open or closed, for example, or if the user is moving one of his hands left or right or up or down. In this manner, the user may be able to grab and/or manipulate objects displayed by the computing system, as will be described below.

Figure 1:
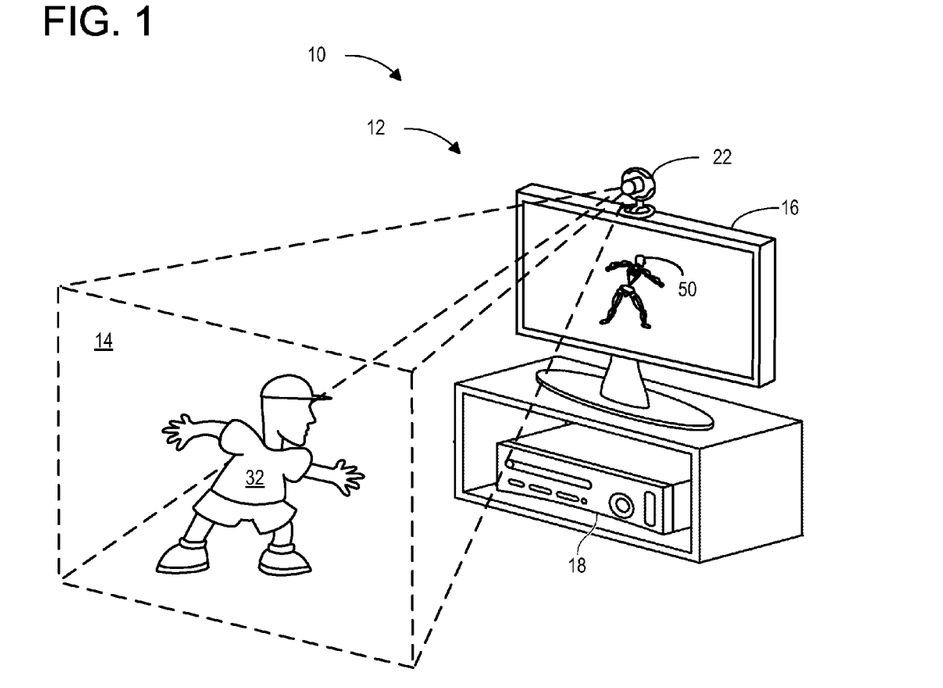
FIG. 1 shows a depth-image analysis system viewing an observed scene in accordance with an embodiment of the present disclosure.

FIG. 1 shows a nonlimiting example of a depth-image analysis system 10. In particular, FIG. 1 shows a gaming system 12 which includes a computing system 18 that may be used to play a variety of different games, play one or more different media types, and/or control or manipulate non-game applications and/or operating systems. As shown in FIG. 1, gaming system 12 also includes a display device 16 such as a television or a computer monitor, which may be used to present game visuals to game players. As one example, display device 16 may be used to visually present a virtual avatar 50 that human target 32 controls with his movements. The depth-image analysis system 10 may include a capture device, such as a depth camera 22, that visually monitors or tracks human target 32 within an observed scene 14. Depth camera 22 is discussed in greater detail with respect to FIGS. 2 and 6.

Human target 32 is shown here as a game player within observed scene 14. Human target 32 is tracked by depth camera 22 so that the movements of human target 32 may be interpreted by gaming system 12 as controls that can be used to affect the game being executed by gaming system 12. In other words, human target 32 may use his or her movements to control the game. The movements of human target 32 may be interpreted as virtually any type of game control. Some movements of human target 32 may be interpreted as controls that serve purposes other than controlling virtual avatar 50. As nonlimiting examples, movements of human target 32 may be interpreted as controls that steer a virtual racing car, shoot a virtual weapon, navigate a first-person perspective through a virtual world, or manipulate various aspects of a simulated world. Movements may also be interpreted as auxiliary game management controls. For example, human target 32 may use movements to end, pause, save, select a level, view high scores, control volume, communicate with other players, etc.

Depth camera 22 may also be used to interpret target movements as operating system and/or application controls that are outside the realm of gaming. Virtually any controllable aspect of an operating system and/or application may be controlled by movements of a game player, such as human target 32. For example, as described with reference to FIGS. 4-6 below, a user interface may be controlled by movements of the game player. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure. While a game is provided as an illustrative example, the same concepts apply equally well to virtually all other computer user interactions.

The methods and processes described herein may be tied to a variety of different types of computing systems. FIG. 1 shows a nonlimiting example in the form of gaming system 12. In general, a depth-image analysis system may include a computing system 60, shown in simplified form in FIG. 7, which will be discussed in greater detail below.

Figure 2:
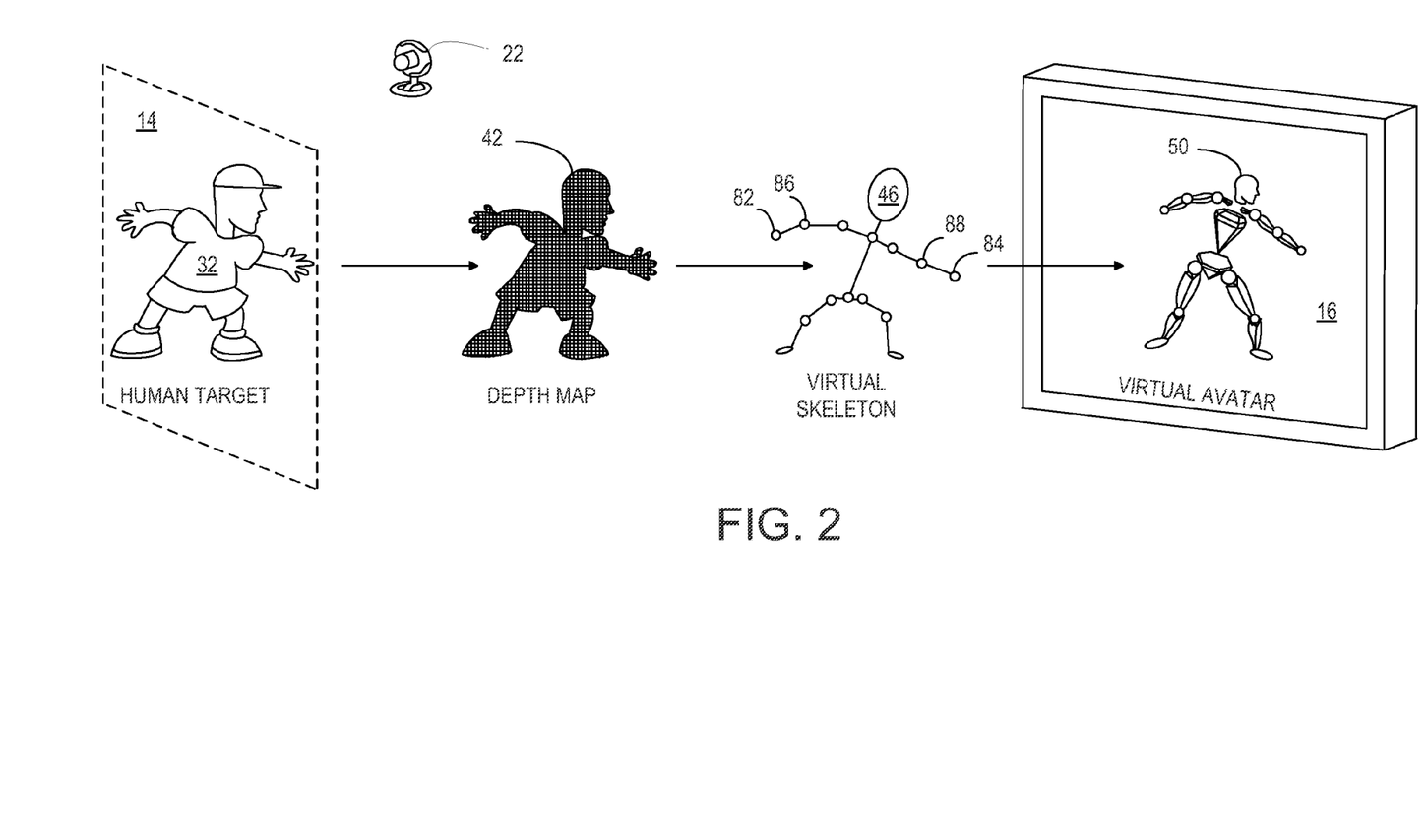
FIG. 2 somewhat schematically shows a human target in an observed scene being modeled with example skeletal data.

FIG. 2 shows a simplified processing pipeline in which human target 32 in an observed scene 14 is modeled as a virtual skeleton 46 that can be used to draw a virtual avatar 50 on display device 16 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 2, human target 32 and the rest of observed scene 14 may be imaged by a capture device such as depth camera 22. The depth camera may determine, for each pixel, the depth of a surface in the observed scene relative to the depth camera. Virtually any depth finding technology may be used without departing from the scope of this disclosure. Example depth finding technologies are discussed in more detail with reference to depth camera 168 of FIG. 7.

The depth information determined for each pixel may be used to generate a depth map 42. Such a depth map may take the form of virtually any suitable data structure, including but not limited to a matrix that includes a depth value for each pixel of the observed scene. In FIG. 2, depth map 42 is schematically illustrated as a pixilated grid of the silhouette of human target 32. This illustration is for simplicity of understanding, not technical accuracy. It is to be understood that a depth map generally includes depth information for all pixels, not just pixels that image the human target 32, and that the perspective of depth camera 22 would not result in the silhouette depicted in FIG. 2.

Virtual skeleton 46 may be derived from depth map 42 to provide a machine readable representation of human target 32. In other words, virtual skeleton 46 is derived from depth map 42 to model human target 32. The virtual skeleton 46 may be derived from the depth map in any suitable manner. In some embodiments, one or more skeletal fitting algorithms may be applied to the depth map. The present disclosure is compatible with virtually any skeletal modeling techniques.

The virtual skeleton 46 may include a plurality of joints, each joint corresponding to a portion of the human target. In FIG. 2, virtual skeleton 46 is illustrated as a fifteen-joint stick figure. In particular, virtual skeleton 46 includes a left elbow joint 88, a right elbow joint 86, a left hand joint 84, and a right hand joint 82, among others. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, etc.). For example, a hand of the virtual skeleton may be represented by a single joint or the hand may be represented by six or more joints (e.g., one or more joints for the palm and one or more joints for each of the five fingers of the hand). In this manner, it may be possible to determine a change in hand posture (e.g., hand opening or closing). In some embodiments, opened and closed hand postures may be detected even if a hand is modeled as a single joint (e.g., via auxiliary analysis of the depth map).

It is to be understood that a virtual skeleton may take the form of a data structure including one or more parameters for each of a plurality of skeletal joints (e.g., a joint matrix including an x position, a y position, a z position, a rotation, and a posture for each joint). In some embodiments, other types of virtual skeletons may be used (e.g., a wire frame, a set of shape primitives, etc.).

As shown in FIG. 2, a virtual avatar 50 may be rendered on display device 16 as a visual representation of virtual skeleton 46. Because virtual skeleton 46 models human target 32, and the rendering of the virtual avatar 50 is based on the virtual skeleton 46, the virtual avatar 50 serves as a viewable digital representation of the human target 32. As such, movement of virtual avatar 50 on display device 16 reflects the movements of human target 32.

While virtual avatar 50 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device. As will be described in greater detail below, movement of a hand of the human target may be used to control a cursor of a user interface in much the same way that a mouse controls a cursor of a desktop user interface. In this way, settings such as volume, movement through a set of items in a menu, and/or any number of other user interface aspects may be controlled via natural body movements without the assistance of a mouse, special tracking tags, wireless accelerometers, and/or other input devices.

Figure 3A:
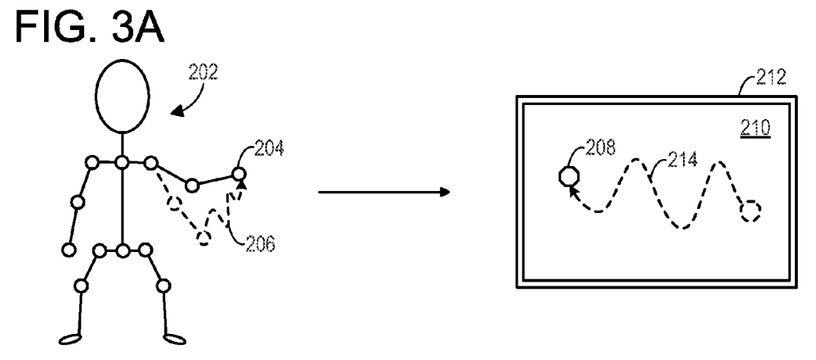
FIGS. 3A-B show examples of unconstrained and constrained cursor movement.
Figure 3B:
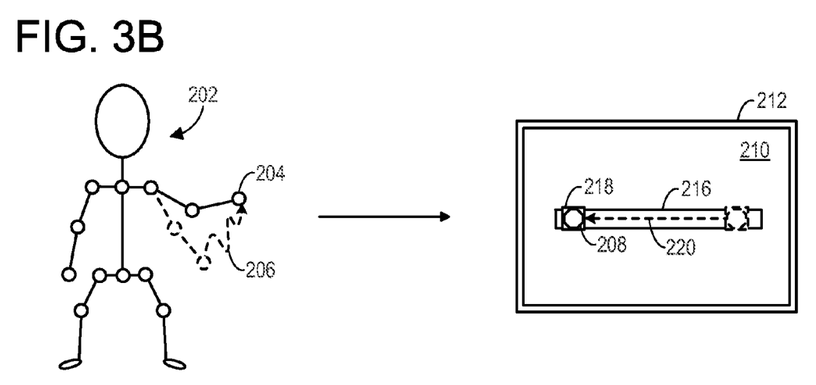

FIGS. 3A and 3B show examples of constrained and unconstrained cursor movement on a user interface. In the examples shown in FIGS. 3A and 3B, movement of a hand of a human target is modeled by virtual skeleton 202. As illustrated, hand joint 204 of virtual skeleton 202, and thus the hand of the human target, moves along path 206. A world space position of the hand is translated to a screen space position of cursor 208 via the gaming system, and movement of cursor 208, which is responsive to the movement of the hand, is displayed on user interface 210 of display 212. In the example of FIG. 3A, the cursor is unconstrained, and cursor 208 moves along path 214 which is a 21) representation of the 3D path 206 of hand joint 204.

In contrast, in the example of FIG. 3B, the cursor is constrained to move along interface guide 216. For example, cursor 208 (and therefore the hand of the human target) may be locked to handle 218 of interface guide 216. The manner in which the cursor may be locked to the handle is described in greater detail below. Because cursor 208 is locked to handle 218, movement of cursor 208 is limited to the path of handle 218 along interface guide 216. As such, if cursor 208 is locked to handle 218, even when hand joint 204 moves along curved path 206 from right to left (e.g., the same path as in FIG. 3A), cursor 208 follows a linear path 220 from right to left along interface guide 216 on user interface 210.

Figure 4:
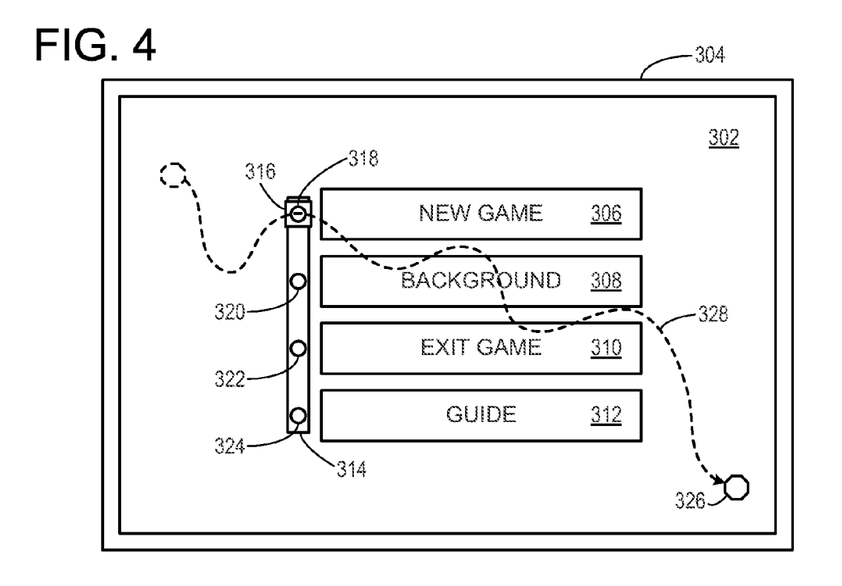
FIG. 4 shows an example of cursor movement in a user interface that includes an interface guide.

FIG. 4 shows a nonlimiting example of a user interface 302 on a display 304, such as a television or a computer monitor. User interface 302 includes a menu which includes four items that can be selected by a user: new game 306, background 308, exit game 310, and guide 312. In the example embodiment of FIG. 4, the items in the menu are arranged along a vertical line. In other embodiments, the menu items may be arranged along a horizontal line, in an elliptical shape, in a spiral shape, or in any other suitable arrangement. Further, the menu is not limited to four items and may contain any suitable number of items.

As shown in the illustrated embodiment of FIG. 4, an interface guide 314 is positioned to the left of the menu and extends vertically along the items of the menu. In other embodiments, the interface guide may be positioned to the right of the menu. In still other embodiments, the interface guide may be a part of the menu. In general, the interface guide may have a similar shape to the menu. For example, as shown in FIG. 4, interface guide 314 is a vertical bar (e.g., a linear shape) adjacent to the menu. In other examples, such as when the menu has a circular shape, the interface guide may have the shape of a circle and be positioned inside or outside of the circle formed by the menu. In still other examples, the interface guide may have a different shape than the menu. For example, the interface guide may be a horizontal line and the menu may be elliptical.

Further, the interface guide may include one or more interface guides connected in a ranched configuration such that it is comprised of a primary interface guide (e.g., a main trunk) with one or more secondary interface guides (e.g., branches)

stemming from the primary interface guide in divergent directions from the primary interface guide. For example, the secondary interfaces guides may be perpendicular to the primary interface guide, or the secondary interface guides may each exist at varying angles (e.g., 50°, 130°, etc.) to the primary interface guide. In some embodiments, the secondary interface guides may have one or more tertiary interface guides, and so on. In the example embodiment of FIG. 4, interface guide 314 is visible to the user on display 304. In other embodiments, the interface guide may not be visible to the user, as will be explained in greater detail below. The interface guide may have any suitable shape or visibility on the display.

A handle 316 is shown coupled to interface guide 314 in the example of FIG. 4. As will be described in greater detail below, a user may lock his hand to handle 316 such that he can slide the handle along interface guide 314. Movement of handle 316 along interface guide 314 allows the user to scroll through the menu and to move from one menu item (e.g., new game 306) to another menu item (e.g., background 308), for example. In the example embodiment of FIG. 4, interface guide 314 includes stops 318, 320, 322, and 324 corresponding to each respective menu item 306, 308, 310, and 312. Although stops 318, 320, 322, and 324 are visible to the user in the example of FIG. 4, in other embodiments, the stops may not be visible to the user. In still other embodiments, the stops may become visible to the user when the handle is moved within a predetermined distance of the stop. Furthermore, each stop may have a corresponding secondary interface guide which may or may not be visible to the user. For example, in some embodiments, the secondary interface guides may be invisible to the user and may become visible when a corresponding stop is activated.

Visibility of and number of stops may depend on a total number of stops along the primary interface guide. For example, if the interface guide is a scrubber along a two hour movie with a stop corresponding to each second of the movie, each stop may remain invisible. As another example, the primary interface guide may correspond to a volume with seven levels and a stop may be visible for each of the seven levels.

As shown in the example of FIG. 4, handle 316 is positioned at stop 318 corresponding to menu item 306 at the top of interface guide 314, which may be a default position of handle 316 when user interface 302 initially appears on display 304. As another example, the position of handle 316 at stop 318 may be a position at which the hand of the user unlocked from handle 316. Unlocking from the handle will be described in greater detail below with reference to FIGS. 5C and 5D.

Continuing with FIG. 4, cursor 326 is shown in the bottom right-hand corner of user interface 302. Cursor 326 is shown to have an octagonal shape. In other embodiments, the cursor may be a spot of light on the screen or the cursor may have another shape, such as a star, arrow, etc. Further, the shape of the cursor may change based on the state of a game or application.

As shown in the example of FIG. 4, cursor 326 is moved along a path 328 from an initial position in the upper left-hand corner of user interface 302 by the user. For example, the user may hold his right arm out in front of his body such that his hand is a distance (e.g., 2 feet) in front of his body (e.g., the position of his hand is closer to the depth camera than the position of his body). A world space position of the user's hand may then be translated to a screen space position of the cursor via the gaming system. As the user moves his hand in world space, the cursor may move responsively on the user interface. For example, if the user moves his hand to the right, the cursor moves to the right. Further, a distance the user moves his hand in world space may be mapped to the distance the cursor moves on the user interface in any suitable manner. Factors such as hand speed may be considered such that fast hand movements result in larger cursor movements and slow hand movements result in more precise cursor movements. In this way, the cursor tracks the movement of the user on the user interface and provides the user with a visual indication of the virtual "position" of the user's virtual hand in screen space.

Figure 5A:
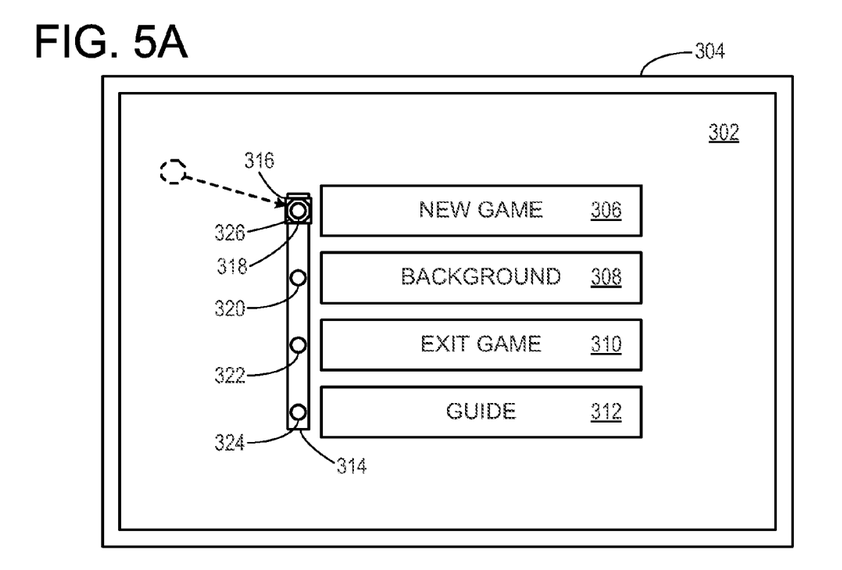
FIGS. 5A-D show an example sequence of user interaction with a user interface that includes an interface guide.
Figure 5B:
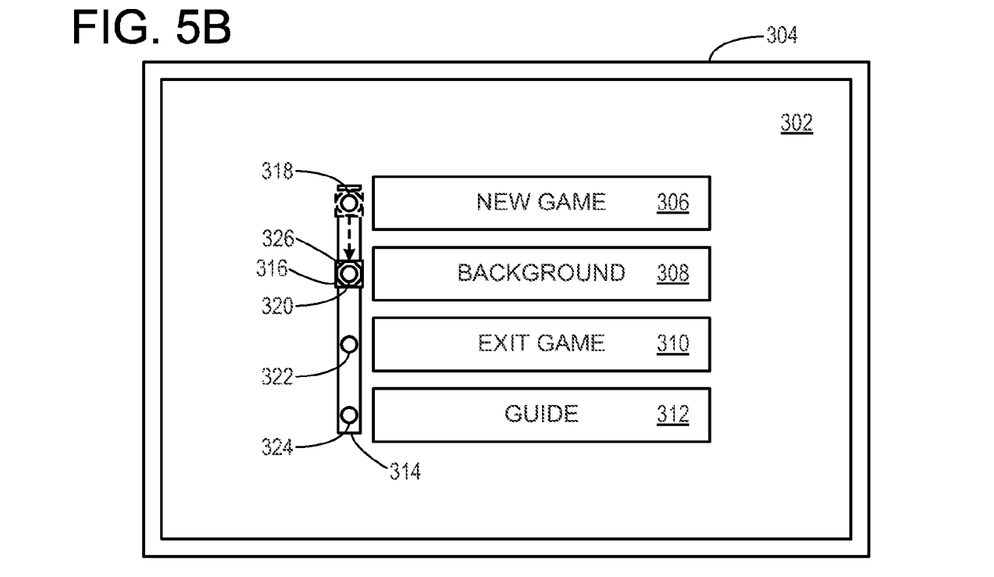

FIGS. 5A-D show a sequence of user interaction via cursor 326 with interface guide 314 (e.g., primary interface guide) in user interface 302. As shown in FIG. 5A, cursor 326 moves from an initial position in the upper left-hand corner of the screen to the position of handle 316 in order to lock to handle 316. Cursor 326 (and thus the hand of the user) may be locked to handle 316 when world space parameters of the hand overcome a grab threshold of handle 316. As an example, the world space parameters of the hand may overcome the grab threshold of the handle if the hand is closed by the user when the cursor is sufficiently close to handle 316. For example, the user may close his hand when the cursor occupies the same screen space coordinates as the handle in order to lock the cursor to the handle.

As another example, the world space parameters of the hand may overcome the grab threshold of the handle if a screen space position of the hand, as visualized by the cursor, is within a threshold distance (e.g., 30 pixels) of the handle for a duration threshold (e.g., 0.5 to 2 seconds). For example, the user may move his hand in world space so that the screen space position of the cursor is within a threshold distance of the screen space position of the handle. Once the cursor has been within the threshold distance for longer than the duration threshold, the cursor, and thus the hand of the user, is locked to the handle.

As yet another example, the world space parameters of the hand may overcome the grab threshold of the handle if the screen space position of the hand is within a threshold distance of the handle and a speed of the hand is less than a speed threshold for a duration threshold. For example, the user may move his hand in world space such that when the cursor is within a threshold distance of the handle, the speed at which he moves his hand slows down. Once the speed of the hand is below the speed threshold for longer than the duration threshold (e.g., the cursor is hovering over the handle), the cursor, and thus the hand of the user, is locked to the handle.

As another example, the world space parameters of the hand may overcome the grab threshold of the handle if the screen space position of the hand is within a threshold distance of the handle and the user moves his hand forward or backward (e.g., toward the display device or away from the display device) a threshold distance. For example, once the hand is within the threshold distance of the handle and the user moves his hand forward the threshold distance (e.g., 12 inches), the cursor, and thus the hand of the user, is locked to the handle.

In some embodiments, once the cursor is locked to the handle, the cursor may become invisible to the user and/or the appearance of the handle may be modified to provide a visual indication that the hand has locked to the handle. In some embodiments, the cursor may become invisible and the handle may increase in size or brightness, for example. In some embodiments, the cursor may remain visible to the user as a part of the handle, as shown in the example of FIGS. 5A-D. Further, once the cursor is locked to the handle, the cursor becomes constrained to move along the one or more interface guides associated with the handle. As such, the world space position of the hand is translated to a screen space handle position that is constrained to move along the one or more interface guides associated with the handle. In the example shown in FIG. 5B, one interface guide 314 is visible (e.g., the primary interface guide) and the handle is moved from stop 318 corresponding to menu item 306 to stop 320 corresponding to menu item 308.

Figure 5C:
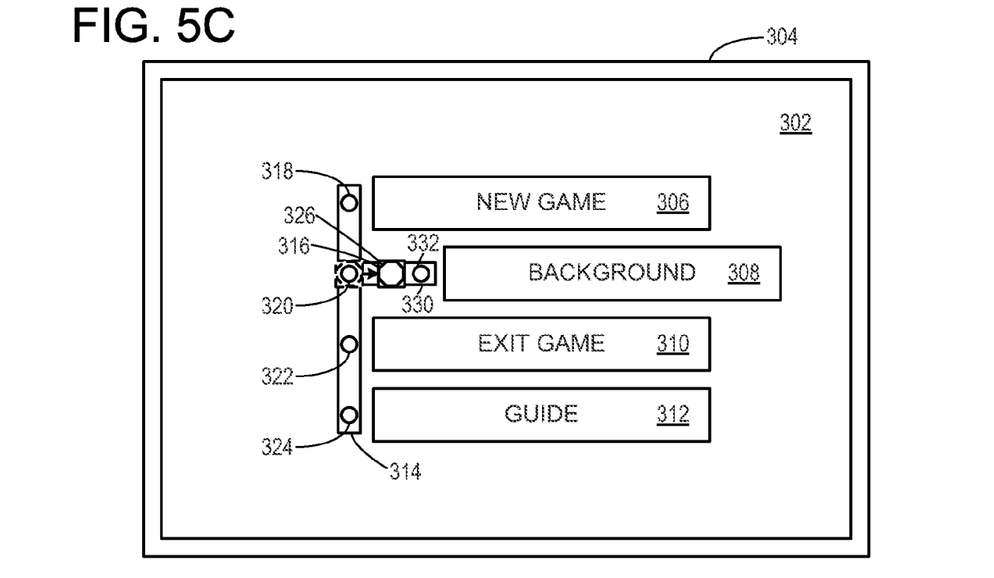

As stated above, each of the stops along the interface guide may correspond to an item that may be selected from the menu associated with the interface guide. A secondary interface guide corresponding to the stop may be displayed when the stop is activated. For example, the stop may be activated when the screen space handle position is within a threshold distance of the stop. Thus, when the handle approaches the stop, a secondary interface guide 330 may extend from interface guide 314 in a divergent direction from interface guide 314 and become visible to the user, as illustrated in the example of FIG. 5G. In other examples, the secondary interface guides associated with each stop may be visible whenever the primary interface guide is visible. In still other examples, the secondary interface guide may be invisible to the user. In some embodiments, secondary interface guide 330 may become visible to the user when the user moves his hand in the direction of the menu item associated with the stop. For example, the user moves the handle to the right toward menu item 308 associated with stop 320 and secondary interface guide 330 becomes visible as depicted in FIG. 5C. Additionally or alternatively, the menu item associated with the stop may move to show progress of the handle along the secondary interface guide when the user moves his hand in the direction of the menu item.

The translation of the length of the primary and secondary interface guides between world space and screen space may be different. For example, the user may move his hand a relatively small distance in world space to move a relatively large distance in screen space along the primary interface guide. In contrast, the user may move his hand a relatively large distance in world space to move a relatively small distance in screen space along the secondary interface guide which may be shorter than the primary interface guide. In this manner, selection of an object corresponding to the secondary interface guide may require a more deliberate motion by the user such that the user does not accidentally select an object he does not wish to select, for example.

When the handle reaches the end of the secondary interface guide, the item corresponding to the secondary interface guide may be selected. In some embodiments, such as shown in FIG. 5C, a stop 332 may be positioned on the end of secondary interface guide 330. Thus, when handle 316 reaches stop 332, the background menu item 308 is selected. In some embodiments, when the item is selected, the cursor, and therefore the hand of the user, unlocks from the handle. In other words, in some embodiments an automatic release threshold of the handle is overcome by virtue of the item being selected.

The cursor may be released from the handle at a release position other than the end of the secondary interface guide when the world space parameters of the hand overcome the release threshold of the handle. For example, the world space parameters of the hand may overcome the release threshold of the handle when the user opens his hand. As another example, the world space parameters of the hand may overcome the release threshold of the handle if a screen space position of the hand is outside of a threshold distance of the handle for a duration threshold. For example, the user may move his hand in world space in a direction away from the primary or secondary interface guides a distance that falls outside of a threshold distance. If the hand remains outside of the threshold distance for longer than the duration threshold, the cursor unlocks from the handle. As another example, the world space parameters of the hand may overcome the release threshold of the handle if the user moves his hand backwards or forwards (e.g., away from the display device or towards the display device) a threshold distance.

Once the cursor unlocks from the handle, the cursor may become visible again if it was invisible while locked to the handle. The cursor may be displayed on the user interface at a screen space position corresponding to a world space position of the hand, for example. Further, once the cursor unlocks from the handle, the handle may retain its position on the interface guide (e.g., the release position of the handle). As such, if the cursor is re-locked to the handle after it unlocks, the start position of the handle is at the previous release position of the handle. In this manner, if a user accidentally unlocks his hand from the handle, progress of the handle along the interface guide is not lost. Further, the handle may be left in a desired position, corresponding to a desired selection and/or setting on the interface guide. In the example of FIG. 5C, if the user unlocks his hand from handle 316, handle 316 remains in its position along secondary interface guide 330.

Figure 5D:
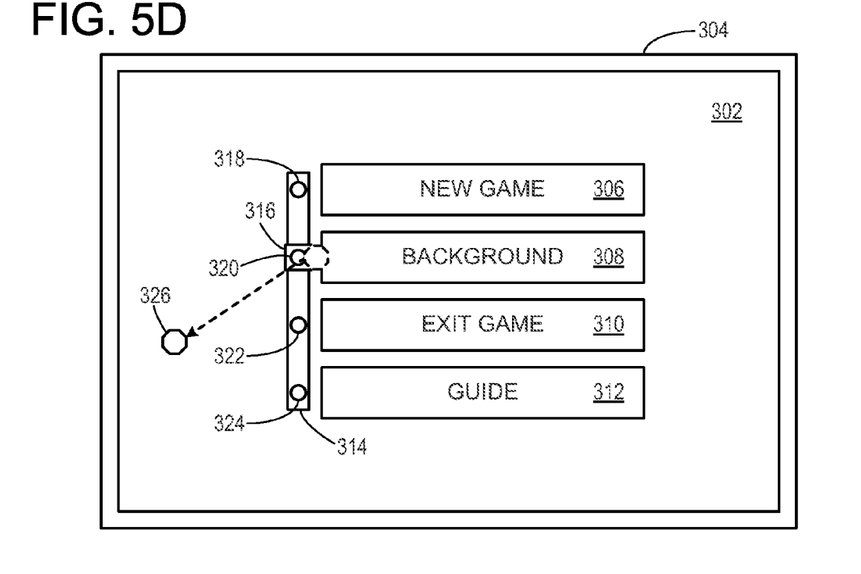

In other embodiments, when a user overcomes the release threshold of the handle and unlocks his hand from the handle, the handle may snap to the screen space position of the closest stop. For example, FIG. 5D shows an example in which cursor 326 is unlocked from handle 316. Because the user was closest to stop 320 when the hand unlocked from handle 316, handle 316 snaps to stop 320. In some embodiments, the handle may snap to the closest stop along the primary interface guide regardless of the distance of the closest stop on the secondary interface guide as snapping to a stop on the secondary interface guide may result in an unwanted selection of the corresponding menu item, for example.

Thus, movement of the hand of the human target (e.g., the user) may be translated to motion of the cursor on the user interface. The user may lock the cursor to the handle of the interface guide associated with a menu in the user interface. Movement of the user's hand in world space then translates to movement of the handle along the interface guide. When the user unlocks from the interface guide, whether intentionally or accidentally, the position of the handle along the interface guide is retained at the release position. In this way, a start position of the handle the next time the cursor is locked to the handle begins at the previous release position of the handle.

Figure 6:
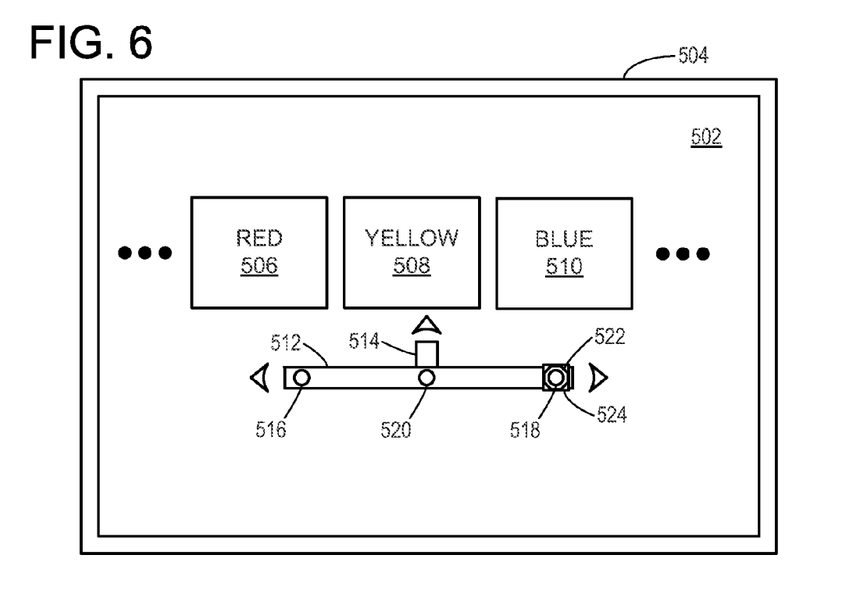
FIG. 6 shows an example of a user interface that includes an interface guide.

Continuing to FIG. 6, it shows another nonlimiting example of user interaction via a cursor with an interface guide in a user interface. In the example embodiment shown in FIG. 6, user interface 502 is displayed on display 504, which may be a television screen, computer monitor, or the like. User interface 502 includes a linear menu with a series of color items along a horizontal line including red 506, yellow 508, and blue 510. For example, the color items may be available background colors for user interface 502 that may be chosen by the user. As shown in FIG. 6, the menu extends in the left and right directions indicating that there are other color options that are not currently visible on display 504.

User interface 502 further includes primary interface guide 512 which is shown as a horizontal bar below the menu items, and secondary interface guide 514 which extends vertically from (e.g., perpendicular to) primary interface guide 512. Further, primary interface guide 512 includes stops 516, 518, and 520. In the embodiment illustrated in FIG. 6, when either of end stops 516 or 518 is activated, scrolling of the menu is initiated. For example, as shown, cursor 522 (and thus the hand of the user) is locked to handle 524 which is positioned at stop 518. As such, the menu scrolls to the right to reveal other items in the menu. If instead, cursor 522 was locked to handle 524 and handle 524 was positioned at stop 516, the menu would scroll to the left. In this manner, the user may view all the items in a list that is too large to fit on the display, for example, or the user may scroll through the pages of a book or a document.

When scrolling is no longer desired, the user may move handle 524 away from stop 518, for example. In some embodiments, an interface guide may not include stops at its ends, and scrolling can be initiated when the handle reaches the stopless ends. Further, a speed of scrolling may increase as the world space position of the user's hand attempts to move the handle farther past the end of the interface guide. In other embodiments, the interface guide may include multiple stops at its ends which correspond to variable scroll speeds that are visually represented in the user interface (e.g., menu), for example.

Continuing with FIG. 6, when a desired color is displayed above secondary interface guide 514, the user may move handle 524 to stop 520 to end the scrolling, for example. Handle 524 may then be moved upward along secondary interface guide 514 in order to select the item above secondary interface guide 514. As described above, once an item is selected, cursor 522 may be released from handle 524. Further, when the user unlocks from handle 524 at any point along primary interface guide 512, as described above, handle 524 may retain the position at which it was released. As such, the user does not lose his place in the list.

Thus, movement of the handle along the interface guide may be used for scrolling along a menu associated with the interface guide. When scrolling is no longer desired, or if the user accidentally unlocks his hand from the handle, the cursor may be unlocked from the handle and the release position of the handle is retained.

Figure 7:
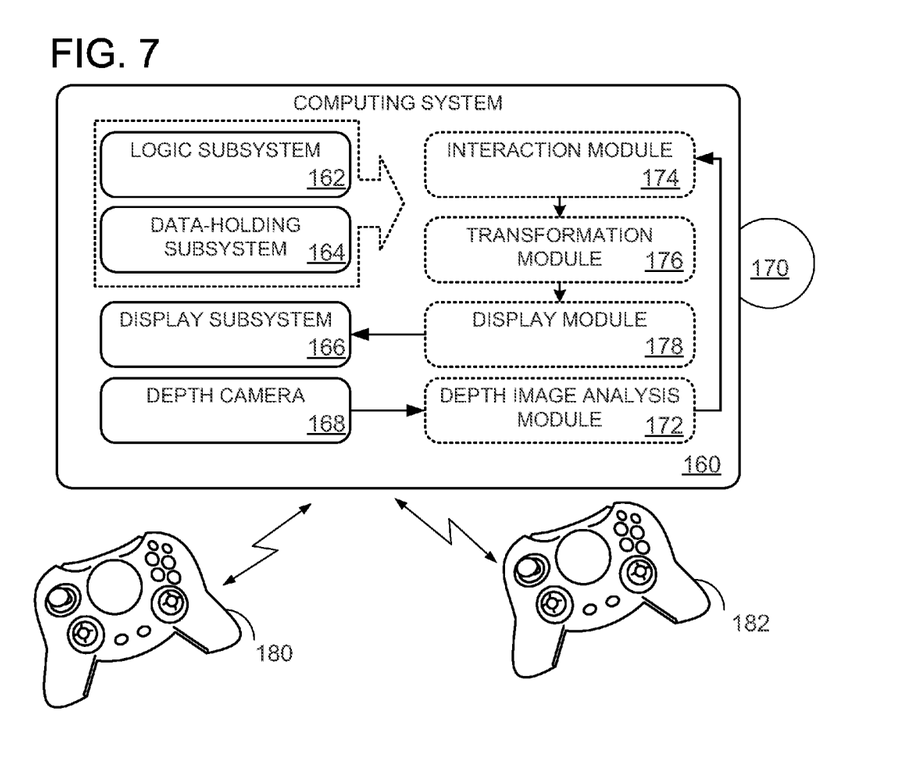
FIG. 7 schematically shows a computing system in accordance with an embodiment of the present disclosure.

The methods and processes described herein near be tied to a variety of different types of computing systems. FIG. 1 shows a nonlimiting example in the form of computing system 18, HDTV 16, and depth camera 22. As another, more general, example, FIG. 7 schematically shows a computing system 160 that may perform one or more of the target recognition, tracking, and analysis methods and processes described herein. Computing system 160 may take a variety of different forms, including, but not limited to, gaming consoles and personal computing systems, among others.

Computing system 160 may include a logic subsystem 162, a data-holding subsystem 164, a display subsystem 166, and/or a capture device 168. The computing system may optionally include components not shown in FIG. 7 and/or some components shown in FIG. 7 may be peripheral components that are not integrated into the computing system.

Logic subsystem 162 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 164 may include one or more physical devices configured to hold data and/or instructions executable by the logic subsystem to implement the herein described methods and processes. When such methods and processes are implemented, the state of data-holding subsystem 164 may be transformed (e.g., to hold different data). Data-holding subsystem 164 may include removable media and/or built-in devices. Data-holding subsystem 164 may include optical memory devices, semiconductor memory devices (e.g., RAM EEPROM, flash, etc.), and/or magnetic memory devices, among others. Data-holding subsystem 164 may include devices with one or more of the following characteristics: volatile, nonvolatile, dynamic, static, read/write, read-only, random access, sequential access, location addressable, file addressable, and content addressable. In some embodiments, logic subsystem 162 and data-holding subsystem 164 may be integrated into one or more common devices, such as an application specific integrated circuit or a system on a chip.

FIG. 7 also shows an aspect of the data-holding subsystem in the form of computer-readable removable media 170, which may be used to store and/or transfer data and/or instructions executable to implement the herein described methods and processes.

The term "module" may be used to describe an aspect of computing system 160 that is implemented to perform one or more particular functions. In some cases, such a module may be instantiated via logic subsystem 162 executing instructions held by data-holding subsystem 164. It is to be understood that different modules and/or engines may be instantiated from the same application, code block, object, routine, and/or function. Likewise, the same module and engine may be instantiated by (Efferent applications, code blocks, objects, routines, and/or functions in some cases.

Computing system 160 includes a depth image analysis module 172 configured to track a world-space pose of a human in a fixed, world-space coordinate system, as described herein. The term "pose" refers to the human's position, orientation, body arrangement, etc. Computing system 160 includes an interaction module 174 configured to establish a virtual interaction zone with a moveable, interface-space coordinate system that tracks the human and moves relative to the fixed, world-space coordinate system, as described herein. Computing system 160 includes a transformation module 176 configured to transform a position defined in the fixed, world-space coordinate system to a position defined in the moveable, interface-space coordinate system as described herein. Computing system 160 also includes a display module 178 configured to output a display signal for displaying an interface element at a desktop-space coordinate corresponding to the position defined in the moveable, interface-space coordinate system.

Display subsystem 166 may be used to present a visual representation of data held by data-holding subsystem 164. As the herein described methods and processes change the data held by the data-holding subsystem, and thus transform the state of the data-holding subsystem, the state of display subsystem 166 may likewise be transformed to visually represent changes in the underlying data. As a nonlimiting example, the target recognition, tracking, and analysis described herein may be reflected via display subsystem 166 in the form of interface elements (e.g., cursors) that change position in a virtual desktop responsive to the movements of a user in physical space. Display subsystem 166 may include one or more display devices utilizing virtually any type of technology. Such display devices may be combined with logic subsystem 162 and/or data-holding subsystem 164 in a shared enclosure, or such display devices may be peripheral display devices, as shown in FIGS. 1 and 9.

Computing system 160 further includes a capture device 168 configured to obtain depth images of one or more targets. Capture device 168 may be configured to capture video with depth information via any suitable technique (e.g., time-of-flight, structured light, stereo image, etc.). As such, capture device 168 may include a depth camera, a video camera, stereo cameras, and/or other suitable capture devices.

For example, in time-of-flight analysis, the capture device 168 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time via a technique such as shuttered light pulse imaging.

In another example, structured light analysis may be utilized by capture device 168 to capture depth information. In such an analysis, patterned light (i.e., light displayed as a known pattern such as a grid pattern or a stripe pattern) may be projected onto the target. On the surface of the target, the pattern may become deformed, and this deformation of the pattern may be studied to determine a physical distance from the capture device to a particular location on the target.

In another example, the capture device may include two or more physically separated cameras that view a target from different angles, to obtain visual stereo data. In such cases, the visual stereo data may be resolved to generate a depth image.

In other embodiments, capture device 168 may utilize other technologies to measure and/or calculate depth values. Additionally, capture device 168 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 160 may optionally include one or more input devices, such as controller 180 and controller 182. Input devices may be used to control operation of the computing system. In the context of a game, input devices, such as controller 180 and/or controller 182 can be used to control aspects of a game not controlled via the target recognition, tracking, and analysis methods and procedures described herein. In some embodiments, input devices such as controller 180 and/or controller 182 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
    a logic subsystem;
    a data holding subsystem holding instructions executable by the logic subsystem to:
        translate a world space position of a hand of a human target to a screen space position of a user interface;
        lock the hand to a visible handle of the user interface if world space parameters of the hand overcome a grab threshold of the visible handle;
        when the hand is locked to the visible handle, translate a world space position of the hand to a screen space visible handle position that is constrained along one or more interface guides;
        unlock the hand from the visible handle at a release position of the visible handle if world space parameters of the hand overcome a release threshold of the visible handle; and
        retain the visible handle at the release position after the hand is unlocked from the visible handle.

2. The computing system of claim 1, where the world space parameters of the hand overcome the grab threshold of the visible handle if the hand is closed by the human target.

3. The computing system of claim 1, where the world space parameters of the hand overcome the grab threshold of the visible handle if a screen space position of the hand is within a threshold distance of the visible handle for a duration threshold.

4. The computing system of claim 1, where the world space parameters of the hand overcome the grab threshold of the visible handle if a screen space position of the hand is within a threshold distance of the visible handle and a speed of the hand is less than a speed threshold for a duration threshold.

5. The computing system of claim 1, where the world space parameters of the hand overcome the release threshold if the hand is opened by the human target.

6. The computing system of claim 1, where the world space parameters of the hand overcome the release threshold if a screen space position of the hand is outside of a threshold distance of the visible handle for a duration threshold.

7. The computing system of claim 1, where translating the world space position of the hand to the screen space position of the user interface includes translating the world space position of the hand to a cursor position of the user interface such that movement of the hand in world space causes corresponding movement of a cursor in screen space.

8. The computing system of claim 1, where the one or more interface guides are connected in a branched configuration.

9. A computing system, comprising:
a peripheral input configured to receive depth images from a depth camera;
a display output configured to output a user interface to a display device;
a logic subsystem operatively connectable to the depth camera via the peripheral input and to the display device via the display output;
a data holding subsystem holding instructions executable by the logic subsystem to:
receive from the depth camera one or more depth images of a world space scene including a human target;
translate a world space position of a hand of the human target to a screen space cursor position of the user interface such that movement of the hand in world space causes corresponding movement of a cursor in screen space;
lock the cursor to a visible handle of the user interface if world space parameters of the hand overcome a grab threshold of the visible handle;
when the cursor is locked to the visible handle, translate a world space position of the hand to a screen space visible handle position that is constrained along a primary interface guide such that movement of the hand in world space causes constrained movement of the visible handle in screen space, the constrained movement deviating from movement of the hand in world space;
unlock the cursor from the visible handle at a release position of the visible handle if world space parameters of the hand overcome a release threshold of the visible handle; and
retain the visible handle at the release position after the cursor is unlocked from the visible handle.

10. The computing system of claim 9, where one or more secondary interface guides extend from the primary interface guide in a branched configuration.

11. The computing system of claim 10, where the primary interface guide includes a stop corresponding to each of the one or more secondary interface guides, and where one of the one or more secondary interface guides is displayed when a corresponding stop is activated.

12. The computing system of claim 11, where the stop is activated when the screen space visible handle position is within a threshold distance of a screen space position of the stop.

13. The computing system of claim 10, where the primary interface guide includes a stop corresponding to each of the one or more secondary interface guides, and where if the world space parameters of the hand overcome the release threshold of the visible handle between two stops, the visible handle snaps to a closer of the two stops.

14. The computing system of claim 10, where the primary interface guide includes a stop corresponding to each of the one or more secondary interface guides, and where the one or more secondary interface guides are displayed whenever the primary interface guide is displayed.

15. The computing system of claim 10, where the primary interface guide is associated with a menu and each of the one or more secondary interface guides correspond to an item in the menu.

16. The computing system of claim 9, further comprising instructions executable by the logic subsystem to initiate scrolling of a list associated with the primary interface guide when the screen space visible handle position reaches an end of the primary interface guide.

17. A computing system, comprising:
a logic subsystem;
a data holding subsystem holding instructions executable by the logic subsystem to:
translate a world space position of a hand of a human target to a screen space position of a user interface;
lock the hand to a visible handle of the user interface if world space parameters of the hand overcome a grab threshold of the visible handle;
when the hand is locked to the visible handle, translate a world space position of the hand to a screen space visible handle position that is constrained along an interface guide, the interface guide having one or more stops; and
when the hand approaches one of the one or more stops, extend the interface guide in a divergent direction at the one stop.

18. The computing system of claim 17, where the interface guide is associated with a menu, and where the one or more stops are each associated with an item in the menu.

19. The computing system of claim 18, where if the hand moves the visible handle in the divergent direction at the one stop, the item associated with the one stop is selected and a release threshold of the visible handle is overcome and the hand unlocks from the visible handle.

20. The computing system of claim 17, where the interface guide has a linear shape, and where extending the interface guide in a divergent direction includes extending the interface guide in a perpendicular direction.

* * * * *